(12) United States Patent
Lin et al.

(10) Patent No.: US 9,268,851 B2
(45) Date of Patent: Feb. 23, 2016

(54) RANKING INFORMATION CONTENT BASED ON PERFORMANCE DATA OF PRIOR USERS OF THE INFORMATION CONTENT

(75) Inventors: Ching-Yung Lin, Scarsdale, NY (US); Zhen Wen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 12/769,945

(22) Filed: Apr. 29, 2010

(65) Prior Publication Data

US 2011/0270845 A1    Nov. 3, 2011

(51) Int. Cl.
*G06F 17/30* (2006.01)

(52) U.S. Cl.
CPC ................... *G06F 17/30864* (2013.01)

(58) Field of Classification Search
CPC ............ G06F 17/30864; G06F 17/30867; G06F 17/30675; G06F 17/30882
USPC .......................................................... 707/748
See application file for complete search history.

(56) References Cited

U.S. PATENT DOCUMENTS

| 8,442,978 | B2* | 5/2013 | Berkhim et al. ............. 707/732 |
| 2006/0010029 | A1* | 1/2006 | Gross ............................ 705/10 |
| 2007/0250500 | A1* | 10/2007 | Ismalon ........................ 707/5 |
| 2008/0133605 | A1 | 6/2008 | MacVarish |
| 2008/0183694 | A1 | 7/2008 | Cane et al. |
| 2009/0018918 | A1* | 1/2009 | Moneypenny et al. ......... 705/14 |
| 2009/0119258 | A1 | 5/2009 | Petty |
| 2009/0132652 | A1* | 5/2009 | Athale et al. ................. 709/204 |
| 2009/0148124 | A1* | 6/2009 | Athsani et al. .................. 386/46 |
| 2009/0150786 | A1 | 6/2009 | Brown |
| 2009/0157617 | A1 | 6/2009 | Herlocker et al. |
| 2009/0171935 | A1 | 7/2009 | Birsan et al. |
| 2010/0268655 | A1* | 10/2010 | Cheuoua ....................... 705/319 |
| 2011/0055207 | A1* | 3/2011 | Schorzman et al. .......... 707/723 |
| 2011/0213785 | A1* | 9/2011 | Kristiansson et al. ........ 707/748 |
| 2012/0078960 | A1* | 3/2012 | Stefik ............................ 707/771 |

FOREIGN PATENT DOCUMENTS

| WO | WO 2009023984 | 10/2013 |
| WO | WO 2008111087 | 9/2015 |

* cited by examiner

*Primary Examiner* — Cam-Y Truong
(74) *Attorney, Agent, or Firm* — Ryan, Mason & Lewis, LLP (57) ABSTRACT

Methods and apparatus are provided for ranking information content based on performance data of prior users of the information content. Information content is ranked by receiving a search request specifying search criteria; identifying a preliminary document list by searching a corpus using the search criteria; identifying content elements in documents in the preliminary document list; assigning a value to at least one document in the preliminary document list based on a score for each content element in the at least one document, wherein the score is based on a performance measure of one or more related users that accessed one or more documents having a given content element; and providing search results based on the assigned values. The score can be assigned, for example, based on a regression model between the performance measure and one or more of the content elements and/or one or more social network metrics.

22 Claims, 5 Drawing Sheets

| TOPIC NUMBER | TOPIC DESCRIPTION | PERFORMANCE DATA COEFFICIENT |
|---|---|---|
| TOPIC 1 | CLIENT, CONTRACT, DEMO | 1000 |
| TOPIC 2 | DINNER, RESTAURANT | 10 |

RANKING INFORMATION CONTENT BASED ON PERFORMANCE DATA OF PRIOR USERS OF THE INFORMATION CONTENT

FIELD OF THE INVENTION

The present invention relates to document ranking systems and, more particularly, relates to methods and apparatus for ranking information content based on performance data of prior users of the information content.

BACKGROUND OF THE INVENTION

Increasingly, enterprises are seeking to improve the productivity of employees who must find valuable information. Existing search and recommendation systems help users to find information content relevant to user queries or profiles. Such existing search and recommendation systems often rank documents using a score based on the number of links among documents. Enterprise documents, however, such as enterprise forms and manuals, often do not contain links. Thus, existing search systems do not perform well for employees searching enterprise documents, such as material that will allow the employee to increase his or her productivity.

To help employees find valuable information that improves their productivity, a comprehensive understanding is required of the intrinsic characteristics of information content within enterprises and how this is related to worker productivity. To this end, recent empirical work has started to capture people's electronic communications (e.g., email, text messaging, and document repositories) as well as productivity metrics (e.g., revenues and performance ratings). In particular, such electronic communications data have the advantage of wide coverage and minimal need of human involvement.

Based on the personal relationships revealed by the captured data, research has shown the benefit of social networks on information worker productivity within an organization. See, for example, S. Aral et al., "Information, Technology and Information Worker Productivity Task Level Evidence," Proc. of the 27th Annual Int'l Conf. on Information Systems (2006); or L. Wu et al., "Value of Social Network—A Large-Scale Analysis on Network Structure Impact to Financial Revenue of Information Technology Consultants," Winter Conf. on Business Intelligence (2009). Most existing studies, however, focus on social network topologies and node properties. There is little, if any, research investigating the correlation between productivity and the ample yet diverse information content created by people's communications.

In particular, existing research does not explain how content can impact information workers' productivity, an issue especially important to enterprises. For example, a "hot" topic mentioned frequently by many people may appeal to the personal life of an employee, but may not improve his or her productivity. Thus, a need still exists for methods and apparatus for discovering valuable topics in an enterprise environment, such as information to improve worker productivity. Yet another need exists for methods and apparatus that rank information content by value to productivity by mining the relationship among people's productivity data (e.g., financial performance), generated information content and social network.

SUMMARY OF THE INVENTION

Generally, methods and apparatus are provided for ranking information content based on performance data of prior users of the information content. According to one aspect of the invention, information content is ranked by receiving a search request specifying one or more search criteria; identifying a preliminary document list by searching a corpus using the search criteria; identifying content elements in documents in the preliminary document list; assigning a value to at least one document in the preliminary document list based on a score for each content element in the at least one document, wherein the score is based on a performance measure of one or more related users that accessed one or more documents having a given content element; and providing search results based on the assigned values.

In various exemplary embodiments, the score can be assigned based on a regression model between the performance measure and one or more of the content elements and/or one or more social network metrics. The social network metrics can comprise, for example, graph entropy; outdegree; betweenness; network constraint and/or number of managers. For example, the score of a content element can optionally comprise a predicted topic value for a given topic based on a statistical model on the relationship among topics, social network and performance measures. In various exemplary embodiments, the performance measure comprises, for example, one or more of revenue generated by the related users and/or a performance rating of the related users.

The performance measure of related users that accessed the documents can be obtained during a prior training process. In an exemplary implementation, the prior training process comprises automatically collecting accessed documents; automatically collecting performance measures of related users; extracting content elements from collected documents, determining social networks of related users and/or statistically modeling a relationship among topics, social network and performance measures.

A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for discovering valuable topics in an enterprise environment, such as information to improve worker productivity. The present invention estimates the value of a document based on the social network of prior users of the document or documents with similar content elements. Search rankings are improved for members of a group, such as an enterprise, by scoring a document using performance data of other members of the group who have accessed the document. The disclosed ranking of a document employs (i) information about the similarity to the searcher (e.g., similar job functions) of a prior user of the document who is also a member of the group, and (ii) a performance criteria of the prior user.

According to one aspect of the invention, methods and apparatus are provided that rank information content by value to productivity by mining the relationship among people's productivity data, generated information content and social network. For example, topics can be valued based on the revenue generated by related workers. While existing search engines rank documents based on the "relevance" of the documents, aspects of the present invention rank documents based on their value (e.g. potential revenue).

Figure 1:
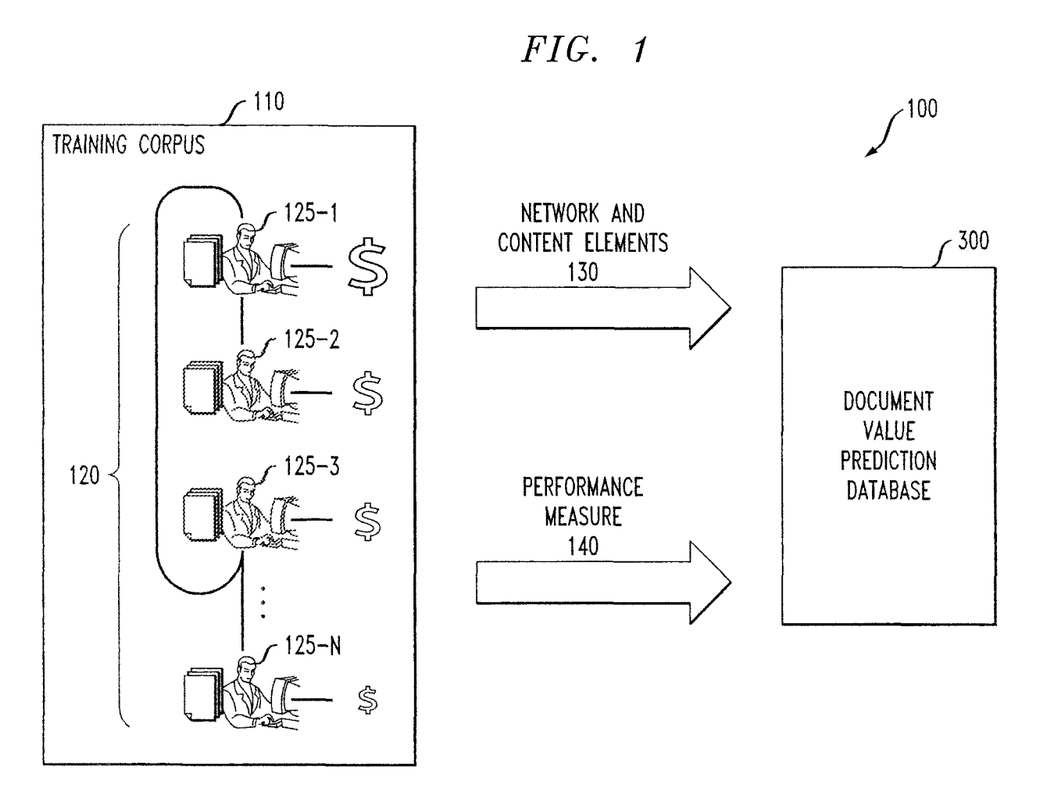
FIG. 1 illustrates an exemplary training process incorporating features of the present invention, which generates a model describing the relationship among the performance measure of prior users of the documents, the content elements of the documents and the social networks of the users.

FIG. 1 illustrates an exemplary training process 100 incorporating features of the present invention. As shown in FIG. 1, a training corpus 110 comprises documents 120 that are accessed by users 125-1 through 125-N of a social network, such as a social network within an enterprise. The documents 120 and users 125 are processed in a manner discussed further below to extract network and content elements 130, such as topics. In addition, the users 125 are processed in a manner discussed further below to extract a performance measure 140, as discussed further below. The extracted network and content elements 130 and extracted performance measures 140 are used to populate a document value prediction database 300, as discussed further below in conjunction with FIG. 3. Generally the training process 100 trains a model from network features to performance data.

Consider an exemplary training corpus 110 from an electronic communication social network of an enterprise containing electronic mail and instant messaging activities. In addition, consider an exemplary pool of users, comprised of consultants that generate revenue by logging "billable hours." Previous studies have suggested that a consultant's ability to generate revenue is an appropriate productivity measure. Therefore, in an exemplary implementation, the revenue generated by a consultant in a given time period is used as the performance measure 140. The consultants can optionally be classified based on an organizational hierarchy, such as non-managers and managers.

Aspects of the present invention seek to identify valuable topics in an enterprise. In one exemplary embodiment, the value of topics is measured by the revenue generated by the workers that access documents containing these topics. As discussed hereinafter, the present invention provides techniques for extracting topics from documents and assigning a value to the topics based on a performance measure of the workers that accessed the documents containing the topics.

In the exemplary embodiment, topics 130 are extracted from the training corpus 110 using Latent Dirichlet Allocation (LDA) techniques. For a more detailed discussion of LDA techniques, see, for example, D. Blei et al., "Latent Dirichlet Allocation," J. of Machine Learning Research, 3:993-1022 (2003), incorporated by reference herein. Generally, LDA is a generative probabilistic model to extract topics. Given a document corpus 110, LDA models each document d as a finite mixture over an underlying set of topics, where each topic t is characterized as a distribution over words. A posterior Dirichlet parameter $\gamma(d, t)$ can be associated with the document d and the topic t to indicate the strength of t in d. As a result, the document d can be reduced to a vector $\vec{\gamma}_d = \langle \gamma(d,t_1), \gamma(d,t_2), \ldots \gamma(d,t_T) \rangle$, where T is the total number of topics.

Rare terms (e.g., misspelled words) and common terms (e.g., the name of the enterprise) can be removed using Term Frequency Inverse Document Frequency (TF-IDF) techniques.

Topic Values

Email and instant text messaging are two medium for consultants to communicate for their daily work. Thus, the present invention recognizes that the content of emails and chats can be correlated to the consultants' productivity. To measure the value of topics, they are related to the productivity measure of the corresponding consultants, such as the revenue generated by the consultants. A topic is considered to be of high value, if the topic has high influence on the consultants' productivity.

A matrix S is defined to describe the relationship between consultants and topics, where an element $s_{ij}$ denotes the degree the i-th consultant is involved in the j-th extracted topic. Element $s_{ij}$ is computed by aggregating the strengths of the topic in all of the i-th consultant's emails and chats. Specifically:

$$s_{i,j} = \sum_{d \in D_i} \gamma(d, t_j)$$

where $D_i$ is the set of content by the i-th consultant and $\gamma(d, t_j)$ is a posterior Dirichlet parameter describing the j-th topic strength in a document d.

S is then normalized by $$s_{i,j} = \sum_{d \in D_i} \gamma(d, t_j),$$

such that $s_{ij}$ represents the percentage of the i-th consultant's communication efforts spent on the j-th topic.

Next, a linear regression model is employed to examine the effect of topics on revenue, as follows:

$$r_i = q_0 + \sum_{j=1}^{T} q_j \cdot s_{i,j},$$

$$(i = 1, \ldots, M)$$

where $r_i$ is the revenue generated by the i-th consultant, $q_0$ is a constant revenue that is independent of topics, $q_j$ are the coefficients that indicate the effects of topics on revenues, M is the number of consultants. Intuitively, $q_j$ is the revenue (for example, in US dollars) that a consultant can make in a year in addition to $q_0$ for every percent of his communication efforts on the j-th topic.

It has been found that topics have statistically significant effects on revenues. There can be positive and negative values among the coefficients, $q_j$. The positive coefficients imply that the corresponding topics have positive effects on revenues, and negative coefficients imply negative impact. It is valuable for enterprise to find topics with both positive and negative impact on revenues. Thus, the magnitude of coefficients $|q_j|$ is used as an indicator of topic value.

Figure 2:
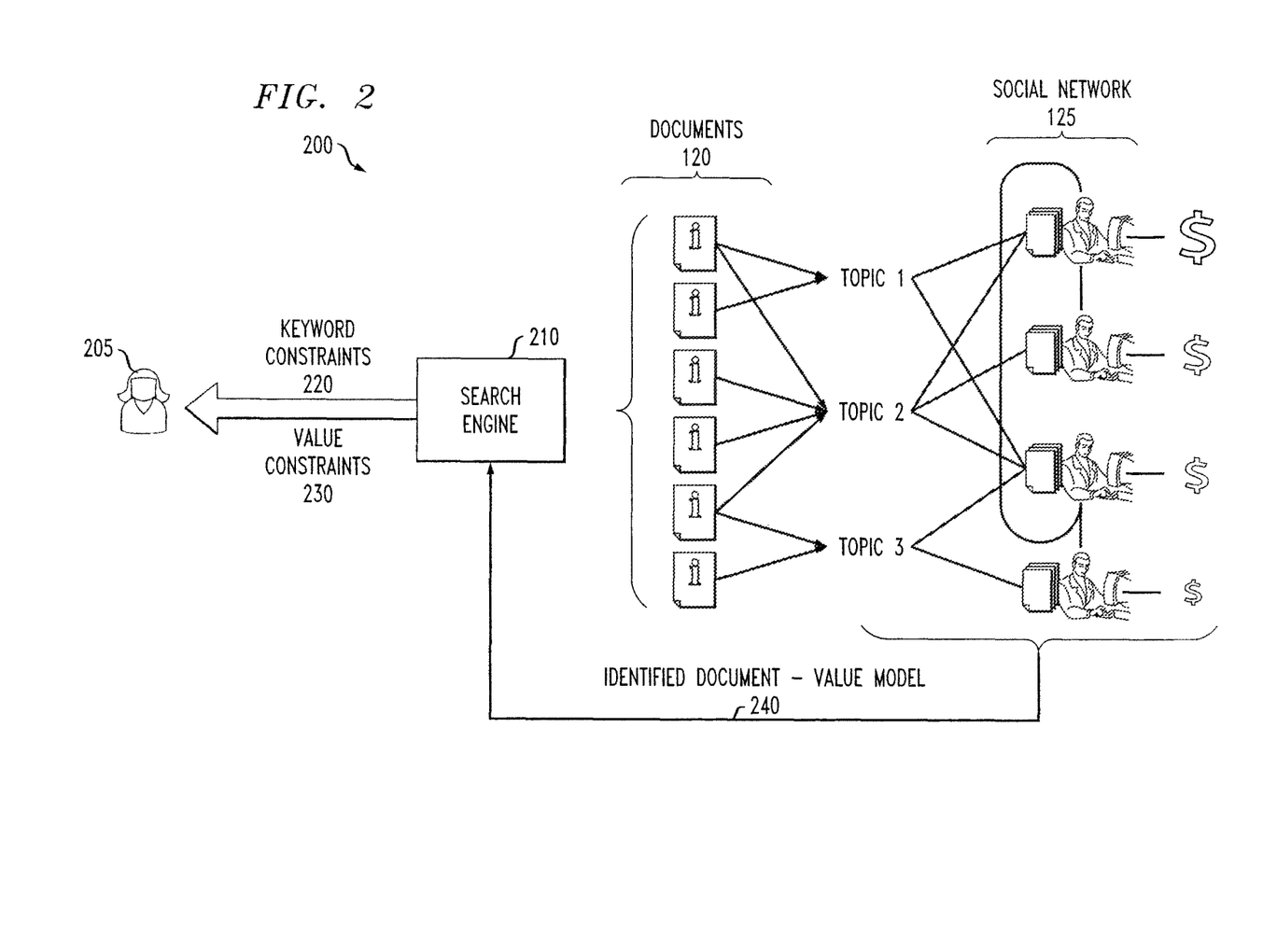
FIG. 2 illustrates a process for estimating the value of one or more documents based on the model trained in the process illustrated by FIG. 1.

FIG. 2 illustrates a process 200 for estimating the value of one or more documents 120 based on the model trained from the social network 125 of prior users of the documents 120. As shown in FIG. 2, a search engine 210, for example, based on the Google™ search engine, receives a search request, specifying search criteria, from a user 205. As discussed further below in conjunction with FIG. 6, the search engine 210 identifies a preliminary document list by searching the corpus 120 using the search criteria. In one exemplary embodiment, discussed further below in conjunction with FIG. 3, the latent topics (also referred to as content elements) that are extracted from the documents 120 of the social network 125 are tagged with a performance measure 140 of prior users of the documents containing the topics, to form a document-value model 240.

The exemplary search engine 210 assigns a value to each document 120 in the preliminary list based on a score for each content element that is determined by the performance measure 140 of the related users who accessed a document having that content element during the prior training (FIG. 1). The exemplary search engine 210 then returns search results containing keyword constraints 220 and value constraints 230, based on the assigned values.

Figure 3:
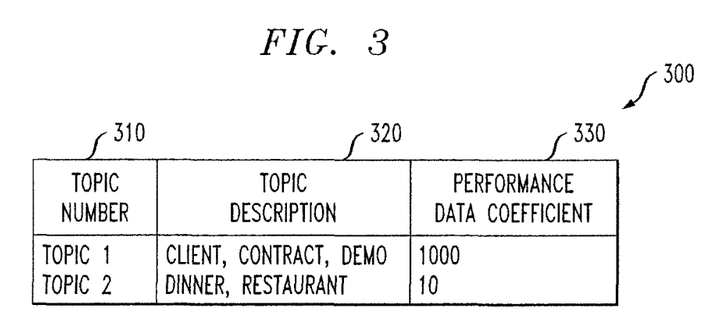
FIG. 3 is a sample record from an exemplary document value prediction database of FIG. 1.

FIG. 3 is a sample record from an exemplary document value prediction database 300. As shown in FIG. 3, the exemplary document value prediction database 300 comprises a plurality of records, each associated with a different topic. For each topic, identified by topic number in field 310, the exemplary document value prediction database 300 records a topic description in field 320 and a performance data coefficient in field 320.

The performance data coefficient in field 320 is based on the training process of FIG. 1, using prior users' performance data. The exemplary topic 1 has a coefficient of 1000 and the exemplary topic 2 has a coefficient of 10. A performance data coefficient of 1000 means that if a user spends one more percent of his communication time on topic 1, he will generate $1000 more in a year. In contrast, a performance data coefficient of 10 means that if the user spends one more percent of his communication time on topic 2, the user will just generate $10 more.

Topic Values without Performance Data

The present invention recognizes that many applications may not be able to have access to sufficient worker performance data. Therefore, it is highly desirable to train topic value prediction models based on limited performance data.

Another aspect of the invention finds potentially valuable topics when the worker performance data is not yet available. As discussed hereinafter, a number of factors are identified that can be used to rank topics by value. In various embodiments, one or more content and social network factors are used to rank topics by value. The present invention recognizes that social networks of high-impact topics have strong clusters because strong relationships among topic participants can be conducive to productivity in the topic-related projects. In contrast, networks of low-impact topics may be scattered since the topics may be general and can involve a diverse population in the enterprise.

On the other hand, conventional content analysis techniques are good at selecting the first few high-value topics. The present invention recognizes that social network features outperform content analysis in filtering low-value topics.

Factor Definitions

Generally, Linear Discriminant Analysis (LDA) models a topic t as a distribution over words. Thus, the TF-IDF metric of a topic can be computed by aggregating each word's TF-IDF measure weighted by the word probability. Formally, the metric is computed by:

$$TFIDF(t)=\Sigma_{w \in W_t} P_t(w) \cdot tfidf(w),$$

where $W_t$ is the set of words for topic t, $P_t(w)$ is the probability of the word w under topic t, and $tfidf(w)$ is the TF-IDF measure of the word w.

Social Network Metrics

To compute social network metrics of a topic, the exemplary embodiment first extracts the topic sub-network for consultants involved in the topic, using the consultant-topic relationship matrix S defined above. Specifically, for the sub-network of the j-th topic, consultants are included whose corresponding topic strength is larger than the median value of the j-th topic strength. In one embodiment, the median measure is used instead of mean because it is a statistically robust measure, especially when the distribution of the values is skewed. Formally, the node set of the j-th topic network is:

$$V_j = (i | s_{ij} > \text{median}_j),$$

where median is the median value of the j-th column in S. An edge between two nodes in the network indicates that there is communication on this topic between the two people. The edge can also be assigned a weight based on the amount of communication.

A. Graph Entropy

A graph entropy metric is used to measure how well the consultants involved in a topic are clustered. First, the topic network G=<V, E> is partitioned into K sub-graphs, using a spectral factorization method. See, for example, J. P. Hespanha, "An Efficient Matlab Algorithm for Graph Partitioning," Technical Report, Univ. of California (October 2004). For a node in the topic network $v \in V$, $p_k$ denotes the probability that v belongs to the k-th partition. Next, graph entropy is used to measure the node distribution P by:

$$H(G, \mathbb{P}) = \sum_{k=1}^{K} p_k \cdot \log \frac{1}{p_k}$$

Intuitively, large values of H mean that all the partitions have similar sizes. In contrast, small values of H indicate that nodes are concentrated in a few partitions, i.e., well clustered.

In an exemplary embodiment, the number of graph partitions K is equal to 100. To examine the impact of K in different ranking scenarios, such as filtering out low-value topics (i.e., N is large) or selecting a few top-value topics (i.e., N is small), the values of N are divided into five ranges: 1~20, 21~40, 41~60, 61~80, 81~100. For each range, the average ranking quality measure is computed.

It has been found that the average ranking quality has larger variation across different K values when N is small, especially when 1<N<20. Thus, the choice of K value may have a larger impact on ranking quality when the scenario is to select a few top-N topics. As the ranking goal becomes to filter out a few low-value topics and retain more valuable topics (i.e., N becomes larger), the impact of K gets much smaller to a point that is negligible. Therefore, the parameter K has little impact on the performance of graph entropy, especially when it is the best performing factor (e.g., when filtering out low-value topics).

B. Network In-Degree and Out-Degree

The network in-degree and out-degree metrics measure the size of communication between a topic network and the outside network. Topic network in-degree is measured as the number of email sent into the topic network while out-degree is measured as the number of emails sent out from the topic network. A consultant is involved in multiple topic networks. Thus, the in-degree and out-degree of the j-th topic network can be weighted by the degree the consultant is involved in:

$$inDegree_j = \sum_{i \in V_j} s_{ij} \cdot I(i)$$

$$outDegree_j = \sum_{i \in V_j} s_{ij} \cdot O(i)$$

where $V_j$ is the node set for the j-th topic network, I(i) is the number of emails coming from the outside network into the i-th consultant, O(i) is the number of emails coming out to the outside network, and $s_{ij}$ represents how strongly the i-th consultant is involved in the j-th topic.

C. Betweenness Centrality

For an individual node i in a social network, the betweenness centrality b(i) measures the relative importance of the node in the information flow within the network. See, for example, L. Freeman, "Centrality in Social Networks: Conceptual Clarification," Social Networks, 1(3):215-239 (1979). Specifically, b(i) is defined as the probability that node i will fall on the shortest path between any two other individuals in a network:

$$\begin{cases} b(i) = \sum_{l<m} [\partial_{lm}(i)/\partial_{lm}] \\ B(j) = s_{ij} \cdot b(i) \end{cases}$$

where $\partial lm(i)$ is the number of shortest geodesic paths from l to m that pass through a node i, and $\partial lm$ is the total number of shortest geodesic paths from l to m. For the topic network of the j-th topic, the overall betweenness centrality is computed by aggregating the values of the individual nodes within the network as:

$$B(j) = \sum_{i \in V_j} s_{ij} \cdot b(i)$$

where $s_{ij}$ represents how strongly the node i (i.e., the i-th consultant) is involved in the j-th topic, and $V_j$ is the node set for the j-th topic.

D. Network Constraint

A network constraint metric can be used to measure the degree to which nodes have diverse contacts (i.e., neighbors) in a network. For an individual node i, the contacts of i are considered diverse if they are not connected to each other. By having diverse contacts, an individual may tap into diverse and novel information sources and thus improve his or her productivity. Formally, the network constraint of I is defined as:

$$c(i) = \sum_l \left( \rho_{il} + \sum_{m \neq i,l} \rho_{im} \cdot \rho_{ml} \right)^2$$

where $\rho_{il}$ is the proportion of node is network efforts invested in communicating with node l. Large values of c(i) indicate that the neighbors of node i are highly connected to each other. Thus, node is contacts are considered concentrated instead of diverse. For the topic network of the j-th topic, the overall network constraint is also computed by aggregating the values of the individual nodes as $C(j)=\Sigma_{i \in v_j} s_{ij} \cdot c(i)$.

E. Number of Managers

Finally, the number of managers in a topic network can be computed, to examine the effect of organizational leadership on topic values.

Predicting Topic Value

Figure 4:
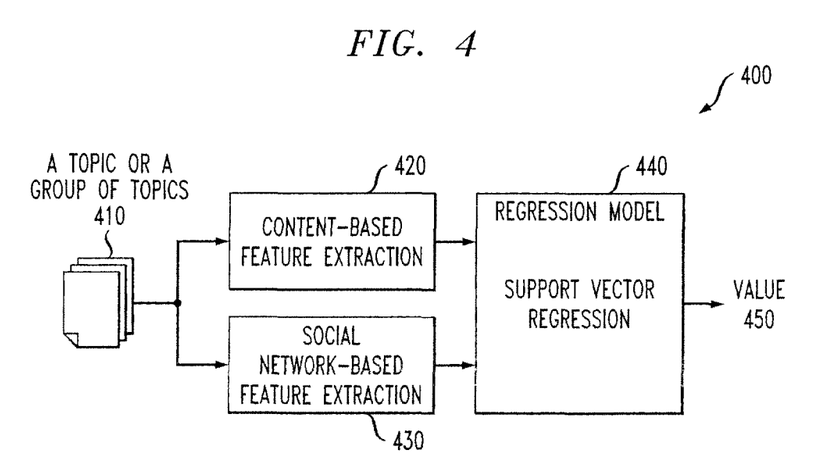
FIG. 4 illustrates an exemplary hybrid process for ranking content by value.

As discussed hereinafter, the identified factors can be combined to predict topic values. FIG. 4 illustrates an exemplary hybrid process 400 for ranking content by value. The process 400 combines social network and conventional content analysis techniques. As shown in FIG. 4, one or more topics 410 are processed using content-based feature extraction techniques 420 and social network-based feature extraction techniques 430. For example, as indicated above, the content-based feature extraction techniques 420 can comprise TF-IDF techniques. Likewise, the social network-based feature extraction techniques 430 extracts features of the topic network (i.e., the social network of people related to given content) using one or more of the above-described social network metrics (such as graph entropy, betweenness, and number of manages).

Regression models 440 are a classic statistical problem that determine the relationship between two random variables $x=(x_1, x_2, \ldots, x_F)$ and y. Independent variable x can be the vector of the social network metrics identified above: x=(TF-IDF; graphentropy; outdegree; betweenness; network constraint; numberofmanagers), and dependent variable y can be the log of topic value indicator log(|q|jqj).

Given the five factors, a linear regression model can be used to predict topic value as:

$$y = y_0 + \Sigma_{j=1}^F a_j x_j.$$

However, this linear regression model gives R-square statistics equal to 0.08, indicating that this problem is highly non-linear.

Due to the strong non-linearity, support vector regression (SVR) can be employed to estimate mappings from topic features 420, 430 to value 450. In SVR, the input x is first mapped onto a high dimensional feature space using a non-linear mapping, and then a linear model is constructed in this feature space. SVR uses a $\epsilon$-insensitive loss function:

$$L_\epsilon = \begin{cases} 0 & \text{if } |y - f_\omega(x)| < \varepsilon \\ |y - f_\omega(x)| & \text{otherwise} \end{cases}$$

where $\epsilon$ is a predefined deviation threshold, and $f_w(x)$ is the regression function to predict y which has a parameter w. Then, the regression is formalized as the following minimization problem:

$$\text{minimize } \frac{1}{2}\|\omega\|^2 + A \sum_{i=1}^l (\xi_i + \xi_i^*)$$

$$\text{subject to } \begin{cases} y_i - f_\omega(x) \leq \varepsilon + \xi_i \\ f_\omega(x) - y_i \leq \varepsilon + \xi_i^* \\ \xi_i, \xi_i^* \geq 0 \end{cases}$$

where A is a constant, and $\xi_i, \xi_i^*$(i=1, . . . ,l)» i; »◻ i (i=1; : : : ; 1) are slack variables introduced for the optimization to measure the deviation of training samples outside "insensitive zone. Ground-truth training data can be collected for SVR by estimating the value indicators of topics extracted from the consultants electronic communication data. To obtain sufficient observations for regression, multiple sets of topics are extracted with different sizes (such as size=50; 60; 70; . . . ; 150), which describe the content of the emails at different granularities. As a result, samples of topic value indicator are obtained, as well as corresponding content and social network features.

Classify Topics Using Predicted Value

The predicted topic value can be used to classify high value topics. In practice, the threshold for high value can vary according to application scenarios. For example, an application may just need to filter out low-value topics, or find topic "above average", or a few top value topics. In an exemplary implementation, three criteria are used for "high-value" topics: (1) C500: more than $500 a year for every 1% of a consultant's communication; (2) C1000: more than $1000 a year for every 1%; and (3) C2000: more than $2000 a year for every 1%. To classify "high-value" topics, a test is performed to determined whether the prediction is larger than a threshold TH. The precision and recall for a particular TH can be defined as:

$$\text{precision}_{TH} = \frac{|E_H \cap E_{TH}|}{|E_{TH}|}$$

$$\text{recall}_{TH} = \frac{|E_H \cap E_{TH}|}{|E_H|}$$

where EH is the ground truth set of "high-value" topics whose value indicators satisfy preselected criteria, and $E_{TH}$ is the set whose predictions are larger than TH. A precision-recall curve can be derived by varying the threshold TH.

Figure 5:
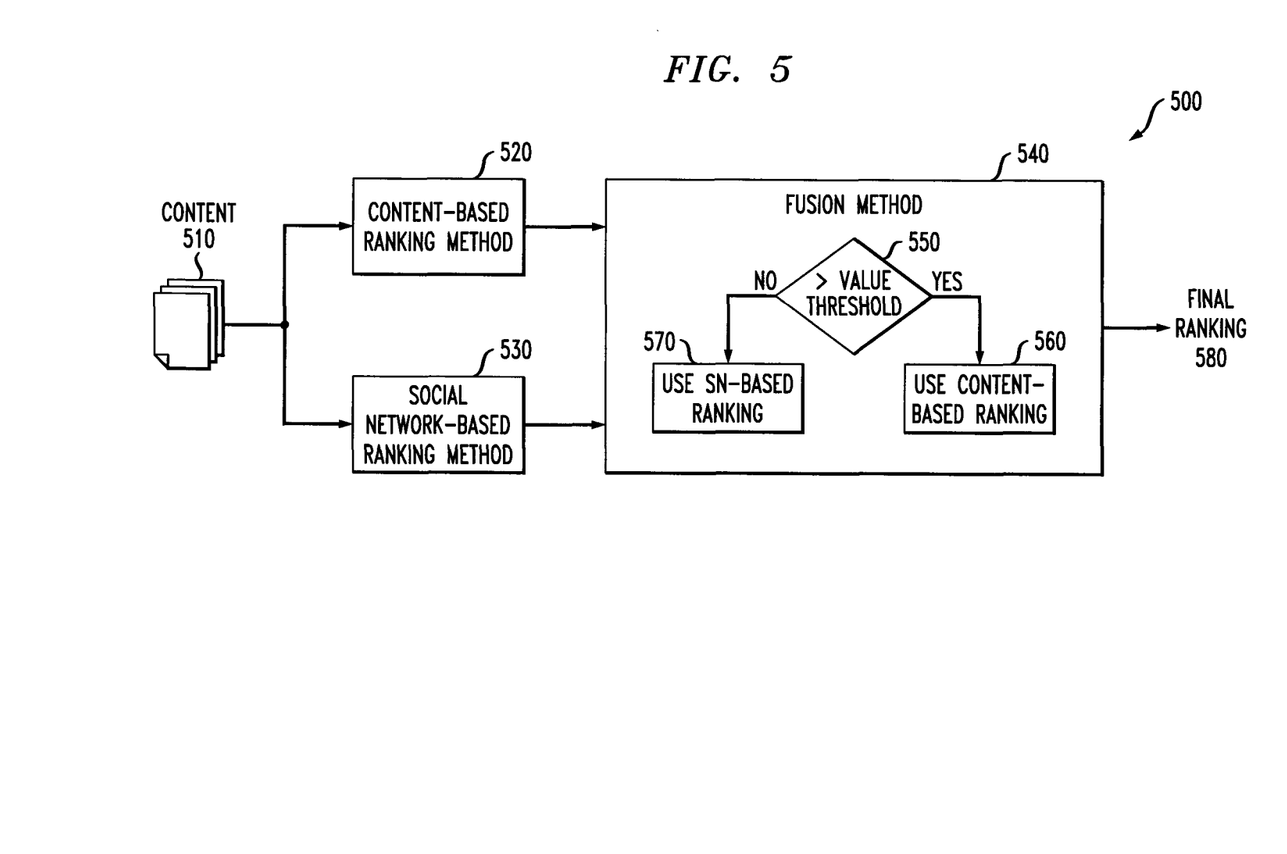
FIG. 5 illustrates an alternate exemplary hybrid process for ranking content by value.

FIG. 5 illustrates an alternate exemplary hybrid process 500 for ranking content by value. The process 500 combines social network and conventional content analysis techniques using the above-described thresholds. As shown in FIG. 5, one or more topics 510 are processed using content-based feature extraction techniques 520 and social network-based feature extraction techniques 530, in a similar manner to FIG. 4.

A test is performed in Fusion Method 540 during step 550 to determine if the topics exceed a value threshold, TH. If the value threshold is exceeded, then conventional content-based ranking is employed in step 550 for the high-valued topics. If, however, it is determined during step 550 that the value threshold is not exceeded, then the social network-based ranking of the present invention is employed in step 570 for the lower-valued topics. During step 580, a final ranking is provided.

Using Factors to Rank Topics by Value

Figure 6:
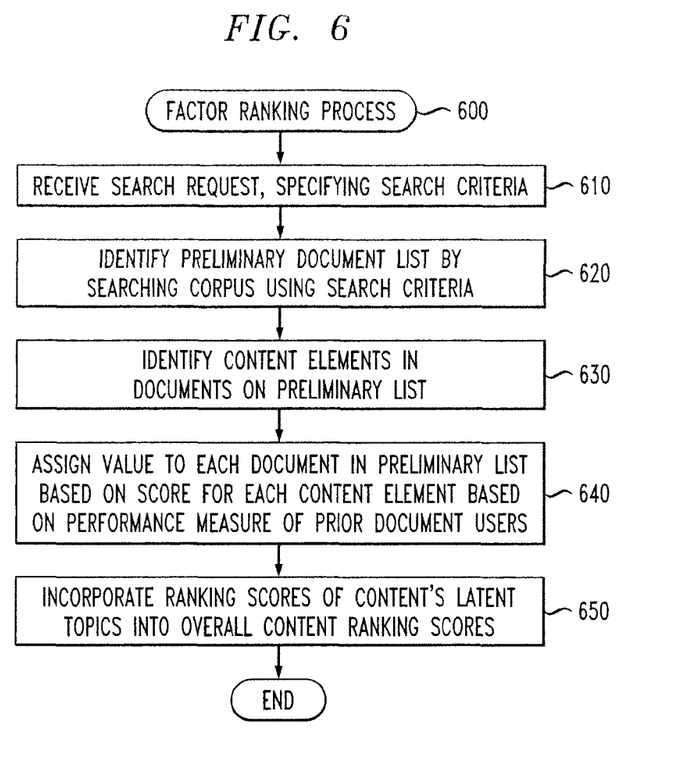
FIG. 6 is a flow chart describing an exemplary factor ranking process incorporating features of the present invention.

FIG. 6 is a flow chart describing an exemplary factor ranking process 600 incorporating features of the present invention. As shown in FIG. 6, the exemplary factor ranking process 600 identifies valuable content by initially receiving a search request, specifying search criteria during step 610. Thereafter, the exemplary factor ranking process 600 identifies a preliminary document list by searching a corpus by using the search criteria during step 620. The content elements in the documents on the preliminary list are identified during step 630.

The exemplary factor ranking process 600 then assigns a value during step 640 to each document in the preliminary list based on a score for each content element that is determined by the performance measure of related users who accessed a document having that content element during prior training.

In one variation, the score is based on one or more of the social network metrics identified above.

Finally, the exemplary factor ranking process 600 incorporates the ranking scores of the content's latent topics into the overall content ranking scores during step 650 and returns the search results based on the assigned values.

Exemplary System and Article of Manufacture Details

In one exemplary embodiment, a statistical model on the relationship among topics, social network and performance measures is obtained by extracting a list of employees involved in a topic; extracting features of the network of these employees; extracting textual features of the topic and estimating parameters of said statistical model using available observations on performance measure, network and topic features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
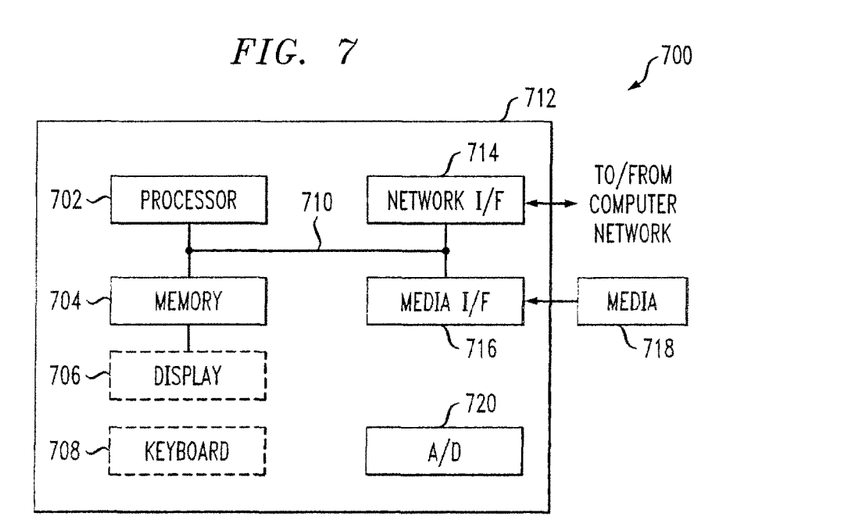
FIG. 7 depicts a computer system that may be useful in implementing one or more aspects and/or elements of the present invention.

One or more embodiments can make use of software running on a general purpose computer or workstation. FIG. 7 depicts a computer system 700 that may be useful in implementing one or more aspects and/or elements of the present invention. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Analog-to-digital converter(s) 720 may be provided to receive analog input, such as analog video feed, and to digitize same. Such converter(s) may be interconnected with system bus 710.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 702. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for ranking information content, said method comprising:
    receiving a search request specifying one or more search criteria from a first individual;
    identifying a preliminary document list of multiple documents corresponding to said search request by searching a corpus using said search criteria;
    identifying one or more content elements in the multiple documents in said preliminary document list;
    assigning a value to at least one document in said preliminary document list based on a score for at least one of the one or more content elements in said at least one document, wherein said score is based on (i) one or more metrics of one or more social networks and (ii) a performance measure of one or more related individuals that accessed one or more of said multiple documents having at least one of the one or more identified content elements, and wherein said score is further based on a regression model between said performance measure and one or more of said content elements, wherein:
        at least one of said one or more metrics is a topological feature of a topic sub-network comprising two or more individuals based on a weighted value derived from communication between two or more individuals within said one or more social networks, wherein said value is weighted based on an amount of communication pertaining to a topic between the two or more individuals,
        at least one of said one or more metrics is a network constraint metric measuring a degree to which an individual has diverse contacts in a network with respect to other contacts in the network, wherein an increase in the diverse contacts provides an increase in information sources to improve productivity of the individual,
        at least one of said one or more metrics is a graph entropy metric measuring the concentration of one or more given individuals clustered across each partition of multiple partitions associated with the topic in the one or more social networks, and
        said performance measure comprises revenue generated by each related individual of said one or more related individuals; and
    providing search results based on said value assigned to the at least one document in said preliminary document list, wherein one or more steps of said method are performed by one or more hardware devices.

2. The method of claim 1, wherein said one or more social network metrics comprise one or more of outdegree, betweenness, and number of managers.

3. The method of claim 1, wherein said performance measure is determined during a prior training process.

4. The method of claim 3, wherein said prior training process comprises one or more of automatically collecting accessed documents, automatically collecting performance measures of related users, extracting content elements from collected documents, determining social networks of related users and statistically modeling a relationship among topics, social network and performance measures.

5. The method of claim 1, wherein said score comprises a predicted topic value for a given topic based on a statistical model on the relationship among one or more topics, said one or more social networks and one or more performance measures.

6. The method of claim 5, wherein said statistical model is obtained by extracting a list of employees involved in a topic, extracting features of the network of the list of employees, extracting textual features of the topic and estimating parameters of said statistical model using available observations on performance measure, network and topic features.

7. The method of claim 1, wherein each social network of said one or more social networks are related to a different one of said content elements.

8. The method of claim 1, wherein one or more of said social network metrics is based on a position of at least one of said two or more individuals in an organization hierarchy.

9. An article of manufacture for ranking information content, comprising a tangible machine readable recordable storage medium containing one or more programs which when executed implement the steps of:
   receiving a search request specifying one or more search criteria from a first individual;
   identifying a preliminary document list of multiple documents corresponding to said search request by searching a corpus using said search criteria;
   identifying one or more content elements in the multiple documents in said preliminary document list;
   assigning a value to at least one document in said preliminary document list based on a score for at least one of the one or more content element in said at least one document, wherein said score is based on (i) one or more metrics of one or more social networks and (ii) a performance measure of one or more related individuals that accessed one or more of said multiple documents having at least one of the one or more identified content elements, and wherein said score is further based on a regression model between said performance measure and the one or more content elements, wherein:
      at least one of said one or more metrics is a topological feature of topic sub-network comprising two or more individuals based on a weighted value derived from communication between two or more individuals within said one or more social networks, wherein said value is weighted based on an amount of communication pertaining to a topic between the two or more individuals,
      at least one of said one or more metrics is a network constraint metric measuring a degree to which an individual has diverse contacts in a network with respect to other contacts in the network, wherein an increase in the diverse contacts provides an increase in information sources to improve productivity of the individual,
      at least one of said one or more metrics is a graph entropy metric measuring the concentration of one or more given individuals clustered across each partition of multiple partitions associated with the topic in the one or more social networks, and
      said performance measure comprises revenue generated by each related individual of said one or more related individuals; and
   providing search results based on said value assigned to the at least one document in said preliminary document list.

10. The article of manufacture of claim 9, wherein said one or more social network metrics comprise one or more of outdegree, betweenness, and number of managers.

11. The article of manufacture of claim 9, wherein said performance measure is determined during a prior training process.

12. The article of manufacture of claim 11, wherein said prior training process comprises one or more of automatically collecting accessed documents, automatically collecting performance measures of related users, extracting content elements from collected documents, determining social networks of related users and statistically modeling a relationship among topics, social network and performance measures.

13. The article of manufacture of claim 9, wherein said score comprises a predicted topic value for a given topic based on a statistical model on the relationship among one or more topics, said one or more social networks and one or more performance measures.

14. The article of manufacture of claim 13, wherein said statistical model is obtained by extracting a list of employees involved in a topic, extracting features of the network of these employees, extracting textual features of the topic and estimating parameters of said statistical model using available observations on performance measure, network and topic features.

15. A computer-implemented method for ranking information content, said method comprising:
   obtaining a plurality of scores for a plurality of documents;
   assigning a value to at least one document of the plurality of documents based on a score of the plurality of scores for at least one of one or more content elements in said at least one document;
   ranking said plurality of documents based on said plurality of scores for one or more content elements in each document of said plurality of documents, wherein each score is based on (i) one or more metrics of one or more social networks and (ii) a performance measure of one or more related individuals that accessed one or more of said plurality of documents having at least one of one or more identified content elements based on one or more search criteria, and wherein each score is further based on a regression model between the performance measure and the one or more content elements, wherein:
      at least one of said one or more metrics is a topological feature of topic sub-network comprising two or more individuals based on a weighted value derived from communication between two or more individuals within said one or more social networks, wherein said value is weighted based on an amount of communication pertaining to a topic between the two or more individuals,
      at least one of said one or more metrics is a network constraint metric measuring a degree to which an individual has diverse contacts in a network with respect to other contacts in the network, wherein an increase in the diverse contacts provides an increase in information sources to improve productivity of the individual,
      at least one of said one or more metrics is a graph entropy metric measuring the concentration of one or more given individuals clustered across each partition of multiple partitions associated with the topic in the one or more social networks, and
      said performance measure comprises revenue generated by each related individual of said one or more related individuals and wherein one or more steps of said method are performed by one or more hardware devices; and
   providing said ranking.

16. The method of claim 15, further comprising the step of providing search results based on assigned values.

17. The method of claim 15, further comprising the steps of:
   receiving a search request specifying one or more search criteria from a first individual;

identifying a preliminary document list of multiple documents corresponding to said search request by searching a corpus using said search criteria; and identifying one or more content elements in the multiple documents in said preliminary document list.

18. The method of claim 15, wherein said performance measure comprises one or more of revenue generated by said related individuals and a performance rating of said related individuals.

19. The method of claim 15, wherein each social network of said one or more social networks are related to a different one of said content elements.

20. The method of claim 15, wherein one or more of said social network metrics is based on a position of at least one of said two or more individuals in an organization hierarchy.

21. An article of manufacture for ranking information content, comprising a tangible machine readable recordable storage medium containing one or more programs which when executed implement the steps of:

obtaining a plurality of scores for a plurality of documents;

assigning a value to at least one document of the plurality of documents based on a score of said plurality of scores for at least one of one or more content elements in said at least one document;

ranking said plurality of plurality of documents based on said plurality of scores for one or more content element in each document of said plurality of documents, wherein each score is based on (i) one or more metrics of one or more social networks and (ii) a performance measure of one or more related individuals that accessed one or more of said plurality of documents having at least one of one or more identified content elements based on one or more search criteria, and wherein each score is further based on a regression model between the performance measure and the one or more content elements, wherein:

at least one of said one or more metrics is a topological feature of topic sub-network comprising two or more individuals based on a weighted value derived from communication between two or more individuals within said one or more social networks, wherein said value is weighted based on an amount of communication pertaining to a topic between the two or more individuals, at least one of said one or more metrics is a network constraint metric measuring a degree to which an individual has diverse contacts in a network with respect to other contacts in the network, wherein an increase in the diverse contacts provides an increase in information sources to improve productivity of the individual, at least one of said one or more metrics is a graph entropy metric measuring the concentration of one or more given individuals clustered across each partition of multiple partitions associated with the topic in the one or more social networks, and said performance measure comprises revenue generated by each related individual of said one or more related individuals; and providing said ranking.

22. The article of manufacture of claim 21, wherein said performance measure comprises one or more of revenue generated by said related individuals and a performance rating of said related individuals.

* * * * *